US006865487B2

(12) United States Patent
Charron

(10) Patent No.: US 6,865,487 B2
(45) Date of Patent: Mar. 8, 2005

(54) METHOD FOR DECIMATING SEISMIC TRACES DRIVEN BY THE SEISMIC PATH

(75) Inventor: Patrick Charron, Tours (FR)

(73) Assignee: Total Fina Elf S.A., Courbevoie (FR)

( * ) Notice: Subject to any disclaimer, the term of this patent is extended or adjusted under 35 U.S.C. 154(b) by 0 days.

(21) Appl. No.: 10/429,978

(22) Filed: May 6, 2003

(65) Prior Publication Data

US 2004/0068377 A1 Apr. 8, 2004

(30) Foreign Application Priority Data

May 6, 2002 (FR) .......................................... 02 05625

(51) Int. Cl.$^7$ ................................................. G01V 1/28
(52) U.S. Cl. ............................................. 702/14; 703/5
(58) Field of Search .............................. 702/14, 12, 10, 702/17; 703/5, 10; 367/56, 18; 175/45

(56) References Cited

U.S. PATENT DOCUMENTS

| | | | | |
|---|---|---|---|---|
| 5,402,391 A | * | 3/1995 | Cordsen | 367/56 |
| 5,430,689 A | * | 7/1995 | Rigsby et al. | 367/15 |
| 5,511,039 A | * | 4/1996 | Flentge | 367/56 |
| 5,784,335 A | | 7/1998 | Deplante et al. | 367/72 |
| 5,924,049 A | * | 7/1999 | Beasley et al. | 702/17 |
| 5,963,879 A | * | 10/1999 | Woodward et al. | 702/17 |
| 6,026,059 A | | 2/2000 | Starr | 367/72 |
| 6,078,869 A | * | 6/2000 | Gunasekera | 702/6 |
| 6,106,561 A | * | 8/2000 | Farmer | 703/10 |

FOREIGN PATENT DOCUMENTS

| | | | | | |
|---|---|---|---|---|---|
| GB | 2334334 A | * | 8/1999 | | G01V/1/36 |
| GB | 2 350 428 A | | 11/2000 | | G01V/1/28 |

\* cited by examiner

Primary Examiner—John E. Barlow
Assistant Examiner—Victor J. Taylor
(74) Attorney, Agent, or Firm—Sughrue Mion, PLLC

(57) ABSTRACT

A method for decimating seismic traces in an acquisition of 3D data, recording, for each trace, the corresponding source-receiver couple coordinates ($S_{a1}$, $R_{a1}$), positioning on a decimation grid (D), divided into cells, the source-receiver couple that corresponds to each trace, regrouping all source-receiver couples into iso-path trace collections, where each collection regroups the traces whose seismic paths are identical or similar, organizing the traces in each iso-path collection, and selecting the first trace in each iso-path collection.

5 Claims, 3 Drawing Sheets

METHOD FOR DECIMATING SEISMIC TRACES DRIVEN BY THE SEISMIC PATH

BACKGROUND OF THE INVENTION

This invention relates to a method for decimating seismic traces in order to provide a 3D depth imagery of the subsoil within an acceptable period of time and at an acceptable cost.

FIELD OF THE INVENTION

Seismic reflection consists in propagating a train of compression waves emitted by a source through the subsoil and then recording at the surface, through the use of receivers (hydrophones in underwater applications and geophones in land applications), the signals that are reflected by the interfaces between the various geological beds through which they pass. Each receiver makes a recording, called trace, which is formed by a succession of signals, time-based, that art representative of said geological beds.

In order to obtain correct images of a 2D cut, we know we must record:

CMP (common mid-points) traces close enough to each other, along one cut, to correctly plot the dip of the beds;

enough offset traces to be able to optimize the signal-to-noise ratio and obtain correct images of the deep horizons;

enough samples per trace to obtain a satisfactory vertical definition making possible a fine detection of the geological beds.

Therefore it is dear that the volume of 2D seismic data is equal to the product of the number of CMPs and the number of offset traces. For example, a 2D line that is 20 km long should normally record 50,000 traces.

In 3D seismic applications, one should multiply the number of traces per line by the number of lines in the Y direction. Thus, a 3D acquisition over a 25×25 km area with traditional parameters, requires the recording of approximately $1.2 \cdot 10^8$ traces. The numeric volume relating to such an acquisition is of approximately 100 giga-octets for a 4 second listening time.

DESCRIPTION OF THE RELATED ART

We understand that a traditional seismic acquisition generates a very high number of seismic traces, and the storing thereof would require a large number of magnetic media. This is a first disadvantage of the traditional 2D and 3D seismic acquisitions.

Another disadvantage appears during the seismic treatment of the recorded traces. The treatment consists in transforming the seismic traces in order to obtain an image of the subsoil. We will describe below two types of traditional treatment methods in the case of underwater 2D seismic application. To make things easier, we will assume that the data is treated in its recording unit, which is time.
Traditional Treatment Using the Collection of 3D Midpoints This seismic treatment consists of a pre-treatment of the traces at shot points, a collection of mid-points or binning, a correction of the dip, the horizontalization of the seismic events, a stacking and lastly a migration. During said treatment the shot point traces, once pre-treated are reorganized and sorted into bins (grid cells in which the binning takes place). This step is accompanied by an adjustment of the offsets by stacking which reduces the number of traces.

However, binning generates two problems:

the stacking by class of offsets is done independently from the azimuth, so that the various seismic paths can be reconstructed into one single trace, the source and receiver coordinates are updated during the stacking. If we perform a Pre Stack Depth Migration (PSDM) treatment, said treatment will use these new coordinates that may result in seismic paths that are very different from those recorded during the acquisition. Therefore, a velocity anomaly could be completely obscured by this kind of treatment, as shown in the attached FIGS. 1 and 2.

Said figures represent an acquisition grid Ø that defines the binning of the treatment sequence. The grid is divided into bins B in the inline direction and the crossline direction.

In FIG. 1, we have represented three segments $La_1$, $La_2$, and $La_3$ respectively linked to three acquired traces. Each of these segments contains a source $Sa_1$, $Sa_2$, and $Sa_3$, a receiver $Ra_1$, $Ra_2$, and $Ra_3$ and a midpoint $Ma_1$, $Ma_2$, and $Ma_2$. Each trace is perpendicular to the sheets plane, directly in line with the corresponding midpoint.

The first phase of the treatment consists in averaging the coordinates of the traces' source points and receiver points whose midpoints are located in a same bin. In FIG. 1, this is the case for segments $La_1$ and $La_2$ linked to the first and second traces. In FIG. 2, we have represented the average positions of the source S, the receiver R, the segment L that links them together and the midpoint M (the latter stays in the same bin) of said segment. In this figure we have reproduced the segment $La_2$ linked to the second trace, without modification, because there is no other trace whose midpoint is located in the same bin as $Ma_2$. We now note that the new segment S-R is not representative of the acquisition, since it completely obscures the velocity anomaly A that was revealed by the acquisition.

Traditional Seismic Treatment Using Decimation

In another type of seismic treatment of acquired data, that tends to reduce the volume of the traces to be treated and as a result reduce the time and cost of the calculation, consists in simply decimating some of these traces. The simplest and most traditional way is to decimate the traces in a statistical manner. Among all the acquired traces, we only retain a sampling that is chosen based on a number criterion. In general, this criterion is not chosen randomly because the geophysicist must be able to predict the effect the chosen decimation will have.

Among the most commonly performed decimations we can list:

the elimination of every other trace in a collection of common shot points: this decimation results in eliminating every other mid point, while keeping the nominal coverage. It is applied very often because the traditional spacing between mid points during the acquisition, is of 6.25 m.

If we eliminate every other trace, the spacing would be 12.5 m which is more than sufficient on the basis of the Fresnel zone as far as the objectives are concerned:

the elimination of one out of every n traces in a collection of common mid points: this decimation is performed when the coverage area is very large and when the signal-to-noise ratio is satisfactory. However, this decimation may have a significant effect on the level of noise. Furthermore, the presence of multiples may require giving up this type of decimation, because the "anti-multiple" algorithms require a considerable coverage in order to be efficient;

the elimination of one out of every n bins: the size of the bin is then doubled in the direction of the line.

However, the most significant dips may be affected by this decimation;

the elimination of one out of every n lines: this type of decimation is simple to carry out but, for operational reasons, it is difficult to obtain a distance between lines that is less than 25 m;

the elimination of a range of offsets: when the zone to be imaged is not very deep, it is possible to reject long offsets that are not very useful. The signal-to-noise ratio will not be as good, but the determination of the velocities will not be penalized.

All these types of decimation have the advantage of being easily implemented, but they do however have several disadvantages:

the decimation rate is, in most cases, in the form of 2" (2, 4, 8, . . . ) which does not provide much flexibility, one single parameter is chosen to drive the decimation (trace number, offset value, CMP number), one decimation direction is preferred, in the case of a partial slacking, the position information is lost, which is detrimental to a PSDM treatment, it is impossible to know if the decimation/staking has kept a satisfactory spatial sampling. The traces that are rejected may be essential to the imagery.

BRIEF SUMMARY OF THE INVENTION

The object of this invention is to remedy the disadvantages of the known decimation methods and therefore it proposes a new decimation method that consists:

in noting, for each trace, the coordinates of the corresponding source-receiver couple, in positioning the source-receiver couple for each trace on a decimation grid that is divided into cells, in regrouping all source-receiver couples into collections of iso-path traces, where each collection regroups the traces whose seismic paths are identical or similar, in organizing the traces in each iso-path collection, and in selecting the first trace in each iso-path collection.

The originality of the method as set forth in the invention resides in the fact that the decimation is no longer performed in a statistical manner, but is based on geophysical criteria. All 3D acquisition traces are sorted based on the seismic path that is defined the source-receiver couple coordinates. Therefore, this pretreatment makes it possible to reduce the volume of 3D seismic data in a simple and efficient manner. Simple because the geophysicist will no longer have to make delicate choices (choice of the decimation direction, choice of the collection in which traces will be eliminated). Now, the decimation is automatically driven on the seismic paths nd the redundant traces are removed. Efficient, on the one hand because this method makes it possible to rapidly select the supernumerary traces, and on the other hand, because most of all this method makes it possible to significantly reduce the calculation time of the PSDM on 3D acquisitions without however damaging the quality of the result.

BRIEF DESCRIPTION OF THE DRAWINGS

The invention will now be understood by reading the following detailed description, made while looking at the attached drawings where.

DETAILED DESCRIPTION OF THE INVENTION

Basic Concept of the Invention

Figure 1:
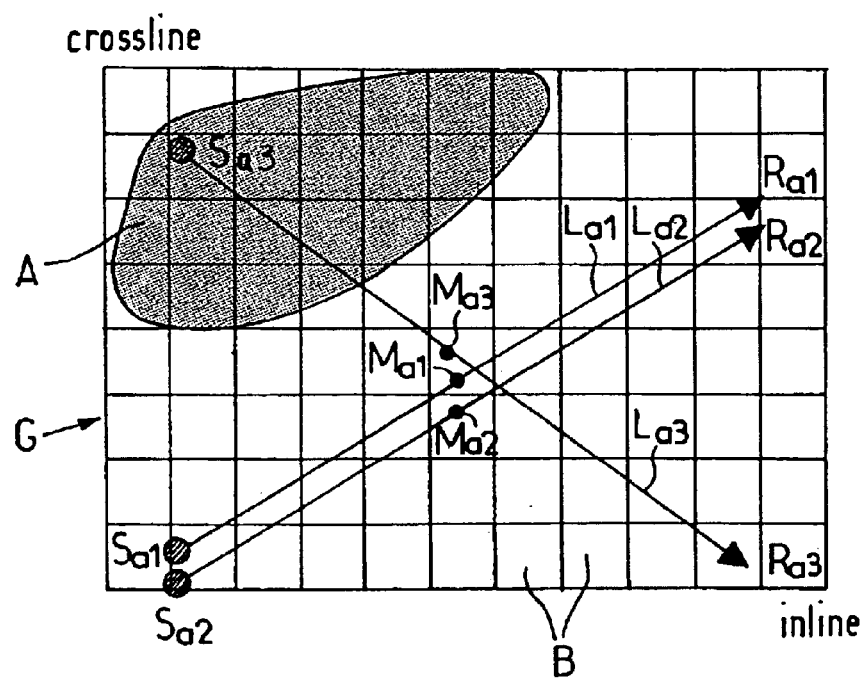
FIG. 1 represents an acquisition grid in which are noted the source and receiver coordinates that correspond to three acquired traces.
Figure 2:
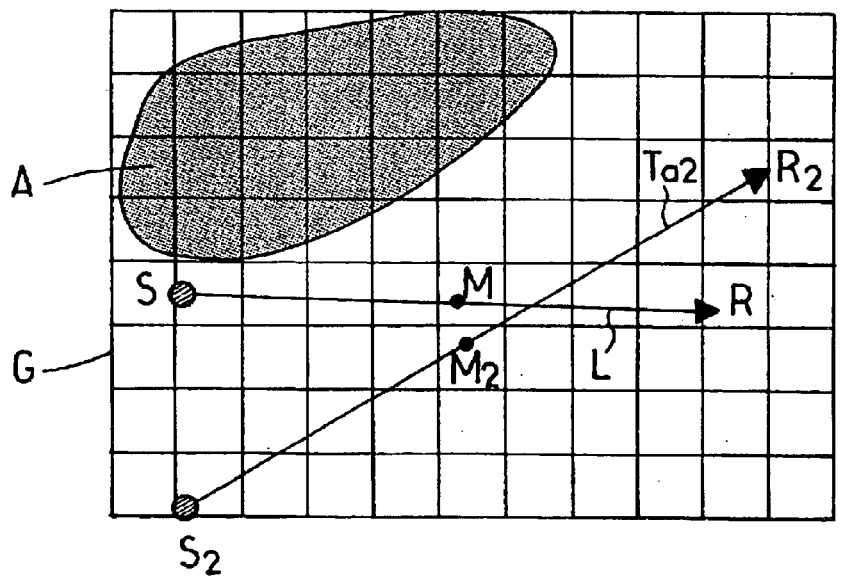
FIG. 2 shows the trace decimation method as set forth in the prior art, which consists in stacking the offsets.

FIGS. 1 and 2 having already been described, we will pass directly on to the description of FIGS. 3 through 6.

When the complexity of the subsoil is such that a seismic treatment in time becomes inadequate, the notion of mid point no longer makes sense. In a depth seismic treatment, and more precisely in a PSDM treatment, the only indications that must be taken into consideration are the coordinates of the trace sources and receivers. From said coordinates, based on a velocity model, we can recreate the path of the seismic wave and calculate its propagation time.

Starting with the notion that for one given position of a source-receiver couple, there is only one linked seismic path, the applicant realized it would be wise to perform a decimation driven by the seismic paths. This decimation would consist in eliminating all source-transmitter couples whose seismic paths are identical or very similar, except for one.

Figure 3:
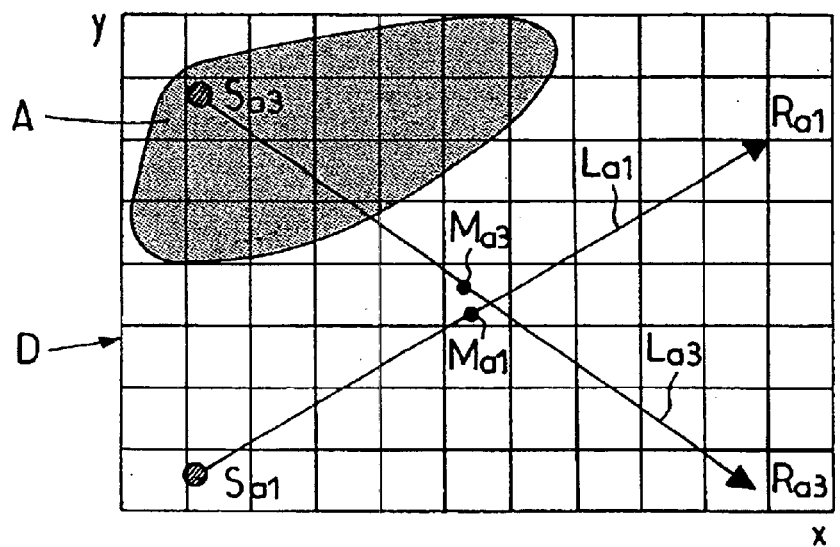
FIG. 3 represents a decimation grid that is used to implement the decimation method as set forth in the invention, by collecting iso-path traces, where this method is applied to the acquisition example of FIG. 1.
Figure 4:
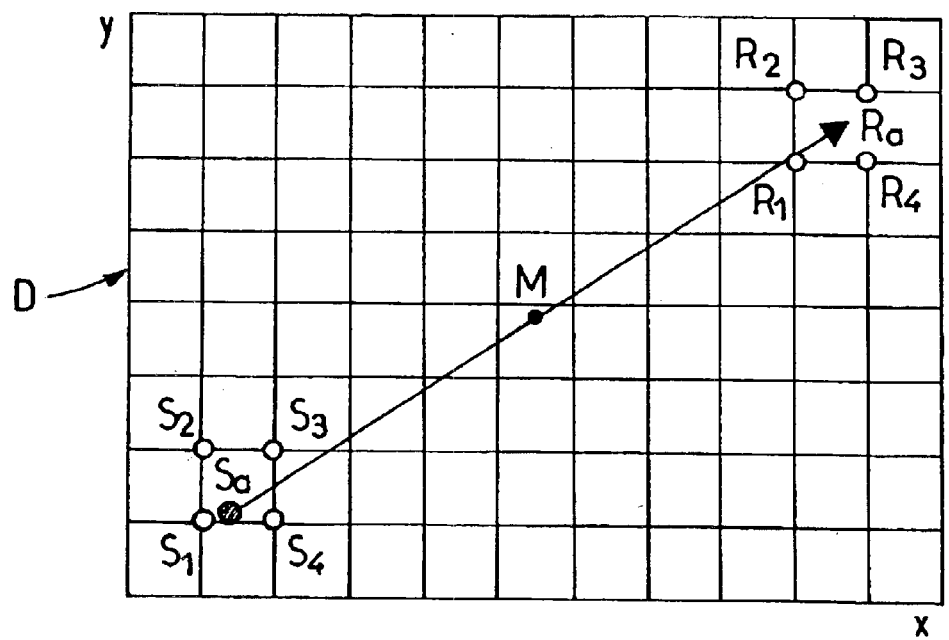
FIG. 4 shows a phase of the method as set forth in the invention which consists in affecting to each source point the four nodes of the cell that surrounds it and to each receiver point the four nodes of the cell that surrounds it respectively.

This phase of the method as set forth in the invention is shown in FIG. 3 where we have performed the decimation on source-receiver paths at the surface, in the case where the three traces are the same as in FIG. 1.

According to the method as set forth in the invention, the trace linked to the $La_2$ segment is redundant because it is very close to the trace that is linked to the $La_1$, segment. Therefore, the $La_1$ segment is not presented in FIG. 3 despite the fact that its mid point $Ma_2$ is located in a bin that is different from that in which the $Ma_1$ mid point of the corresponding trace is located. Following this elimination, the $La_1$ segment linked to the first trace as well as the $La_3$ segment linked to the third trace which is preserved remain on the grid in FIG. 3. We note that thanks to this method of decimation, the velocity A anomaly zone is not obscured.

The same procedure is followed for all the traces. The traces are then sorted into iso-path collections, where each collection regroups the traces whose seismic paths are the same or similar. In each collection we will eliminate all traces except one.

The redundancy of the traces is often found in underwater seismic acquisition. For example, this can occur when two navigated consecutive lines overlap in terms of coverage, or in the case of a change in drift tied to the current, a change in the acquisition direction, in contouring an obstacle, etc.

Implementation of the Procedure

The complexity of the problem resides in the fact that no source-receiver couple is identical during an acquisition. Therefore, it is imperative that a list of all paths that are close to it be drawn up.

In order to do this, we define a new grid called decimation grid D (FIG. 4) where the dimensions of the cells are left to the discretion of the geophysicist, as we will explain later. The size of the cell, expressed in meters, varies between a minimum size, which is the size of an acquisition bin, and a maximum size, which can be five times larger.

The decimation grid is defined in the same domain as the acquisition grid. The cells of the decimation grid can be similar or different than those of the acquisition grid.

The traces are treated in the order in which they arrive. For that, we place the decimation grid on top of the acquisition grid Sa-Ra. The acquired source point $S_a$ is located in a cell of the grid, which is defined by four value couples (x, y) that are the coordinates of the four nodes or corners $S_1, S_2, S_3, S_4$ of the cell. The acquired receiver point Ra is treated in the same way and we obtain four other coupes (x, y) that are the coordinates of the four nodes or corners $R_1, R_2, R_3, R_4$ of the cell in which Ra is located. The eight value couples thus obtained make it possible to define each trace in terms of its path. We can now calculate the Sa Ra offset and the Øa azimuth for all the traces (for example in relation to the east-west axis) using the acquisition coordinates.

Figure 5:
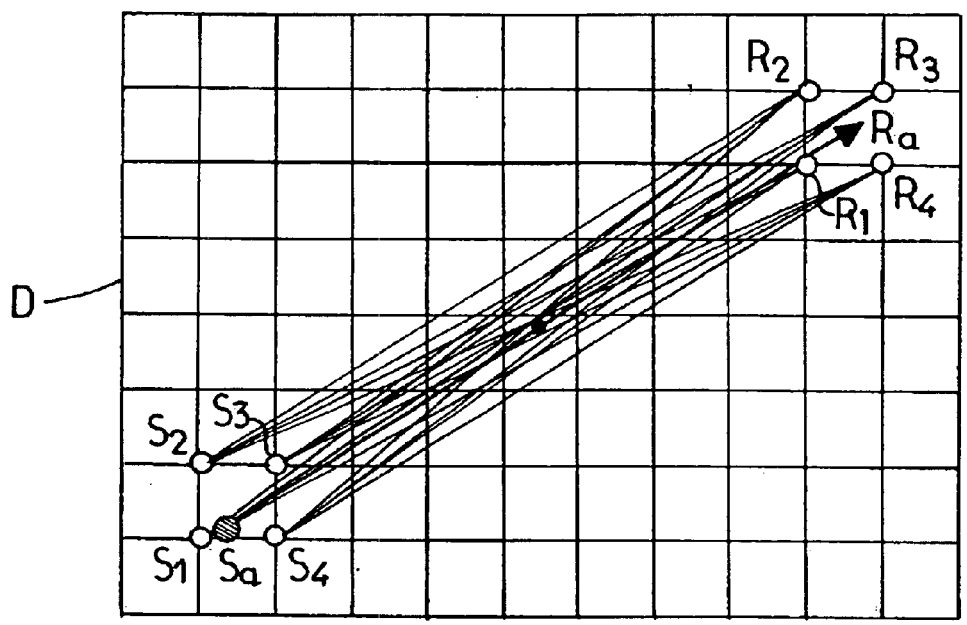
FIG. 5 shows the sixteen segments that respectively link one of the nodes of the source cell to one of the nodes of the receiver cell.

Then, ach node of the source cell is put in relation with each node of the receiver cell. As shown in FIG. 5, sixteen combinations are possible ($S_1R_1$, $S_1R_2$, $S_1R_3$, $S_1R_4$, $S_2R_1$, ..., $S_4R_3, S_4R_4$), where each one represents a fictitious source-receiver couple close to the acquired couple $S_aR_a$. For each of these sixteen combinations or paths, we calculate the offset $S_nR_m$ and the azimuth $Ø_{SnRm}$ in the same way we did with the real $S_a$ and $R_a$ coordinates.

Thus, for each of the sixteen $S_n R_m$ couples we have the following information:

The distance between $S_n$ and $R_m$

The difference in relation to the real offset $S_aR_a$

The $S_nR_m$ segment azimuth in relation to the East-West axis (N270°)

The difference in relation to the acquisition azimuth

The distance between $S_a$ and $S_n$

The distance between $R_a$ and $R_m$.

Figure 6:
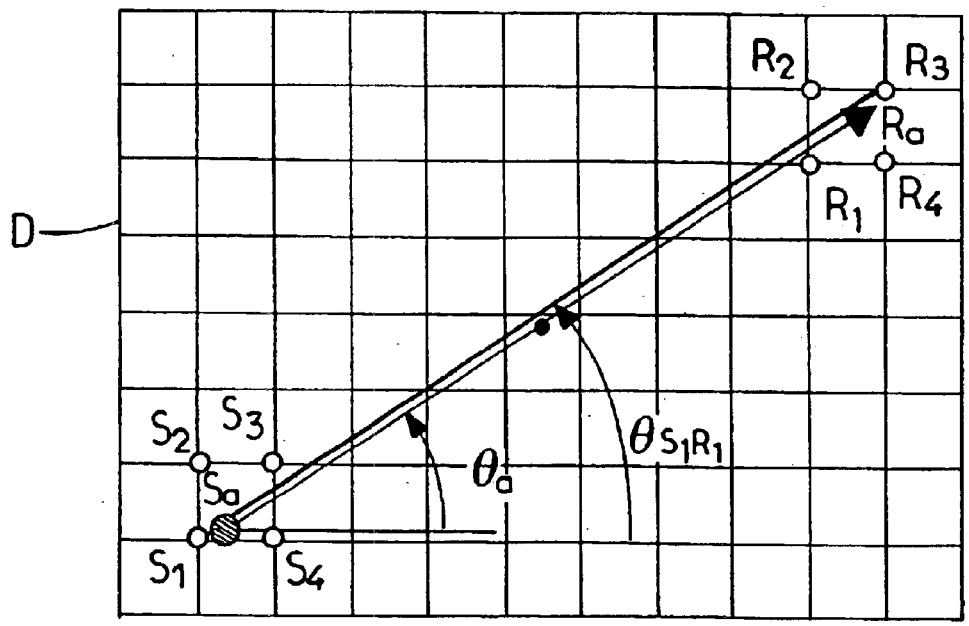
FIG. 6 shows the determination of the source-receiver segment that is most representative of the segment that is linked to the acquired trace.

As shown in FIG. 6, these values will make it possible to extract from the sixteen $S_n R_m$ couples, the one that best represents the truly acquired trace linked to the $S_aR_n$ segment, meaning the segment whose offset and azimuth are closest to the acquisition. We see from FIG. 6 that, in this case, this couple is $S_1R_3$. Its offset $S_1$—$R_3$ and its azimuth $Ø_{S1R3}$ are respectively very lose to those of $S_a$-$R_a$ and $Ø_n$ of the real path.

The calculated distances $S_a$-$S_m$ and $R_a$-$R_m$ can serve to separate couples that have the same interval, offset and azimuth, in relation to the real path.

Obviously, the larger the cells of the grid, the more significant the spaces between calculated trace and the real trace are. From FIG. 5 we note that these intervals are more difficult to minimize for short offsets than for long offsets.

We can also choose a decimation grid whose cell size varies to re-establish a balance in the decimation between long offsets and short offsets.

The real traces are now located using a second set of source and receiver coordinates that correspond to specific nodes of the decimation grid. The initial coordinates that remain unchanged are kept in trace labels so they can be used in the PSDM treatment. The values of the offsets, azimuths and travel distances of the source and receiver points are also stored in order to be able to control the quality of the decimation.

In order to isolate the redundant traces, we must sort all the traces, in increasing order, based on three parameters in the following order:

1. the x and y coordinates of the source position placed on the calculated grid node, $S_n$.
2. the x and y coordinates of the receiver position placed on the calculated grid node, $R_m$.
3. the shift value $(S_a\text{-}S_n)+(R_a\text{-}R_m)$.

We will note that in terms of seismic path, and therefore in terms of imagery, we will consider the $S_n$-$R_m$ and $R_m$-$S_n$ couples in the same way.

This sorting will make it possible to categorize the traces into iso-path collections, which are supposed to represent a set of traces whose images have almost the same geological formations. This also means that the distance traveled by the seismic wave is quite similar and that the travel time is comparable and this is all the more precise as the decimation cell is small.

The decimation as set forth in the invention has the following advantages:

it takes seismic paths into consideration (four parameters), which is perfectly adapted to the PSDM treatment, it is very simple to implement as only the size of the decimation grid cell needs to be defined, the decimation rate can be adjusted quite precisely, the decimation is very fast to perform, the decimation can be done no matter what the order of entry of the traces is, the labels of the traces are not modified so the PSDM treatment can be performed with the real acquisition coordinates.

Results

To test the method as set forth in the invention we carried out a PSDM study on a test zone selected in a salt structure. The test was performed on 461,753 traces.

First we studied the influence of the dx×dy size of the decimation grid cells on the decimation rate. The following table shows that the larger the cell, the more significant the decimation rate.

| Size of the dx × dy cell (meters) | Average rate of Decimation |
| --- | --- |
| 50 × 50 | 1.6 |
| 60 × 60 | 2.2 |
| 70 × 70 | 3.2 |
| 80 × 80 | 4.6 |
| 90 × 90 | 6.2 |
| 100 × 100 | 8.2 |

Then, the test zone was divided according to offset ranges where each one has a width of 500 meters, in order to measure the distribution of the decimated traces. The findings are in keeping with what was predicted, namely that the decimation is eater on the short offsets than on the long offsets.

To continue the test, a cell of 70×70 meters was retained in order to obtain a decimation rate of 3.2. The decimated data was migrated in depth and the result was compared to migrated images with a non-decimated set of data and with the same decimated set in a statistical manner (every other line eliminated). In comparing the three images obtained, we see that the decimation driven according to the invention provides a result that is less noisy than and is closer to the image that was obtained with all the traces than that which was obtained with the data decimated in a statistical manner.

What is claimed is:

1. Method for decimating seismic traces in an acquisition of 3D data, comprising:

recording, for each trace, the coordinates of the corresponding source-receiver couple $(S_{a1}, R_{a1})$, later regrouping all the source-receiver couples into iso-path trace collections, where each collection regroups traces whose seismic paths are identical or similar, characterized in that it consists in positioning on a decimation grid (D), divided into cells, the source-receiver couple that corresponds to each trace, where the positioning phase of the source-receiver couples of each trace consists for each trace in:

locating the source cell of the decimation grid (D) in which the source $(S_a)$ of the acquired trace is located, recording the coordinates (x, y) of the four nodes $(S_1, S_2, S_3, S_4)$ of said cell, locating the receiver cell of the decimation grid in which the receiver $(R_a)$ of the acquired trace is located, recording the coordinates (x, y) of the four nodes $(R_1, R_2, R_3, R_4)$ of said cell and, organizing the traces in each iso-path collection and selecting the first trace in each iso-path collection, where the regrouping phase of the source-receiver couples in collections of iso-path traces consists in:

calculating for each trace, the corresponding offset $(S_a\text{-}R_a)$ and azimuth $(\emptyset_a)$ using the acquisition coordinates, putting each node of the source cell in relation with each node of the receiver cell, where the sixteen combinations obtained $(S_1R_1, S_1R_2, S_1R_3, S_1R_4, S_2R_1, \ldots, S_4R_3, S_4R_4)$ represent all the fictitious source-receiver couples close to the acquired couple $(S_a, R_a)$, calculating for each of said sixteen combinations, the corresponding offset $(S_n\text{-}R_m)$ and azimuth $(\emptyset_{SnRm})$, extracting from the sixteen couples $(S_a R_m, \emptyset_{SnRm})$ thus obtained the one that is closest to the real trace $(S_aR_a)$ and performing the same operations as above with all the acquired traces whose source and receiver are respectively located in the same source cell and receiver cell, so as to create iso-path collections.

2. Method for decimating as set forth in claim 1, characterized in that the organizing and selecting phases in an iso-path collection comprise:

determining the shift value $(S_a\text{-}S_n)+(R_a\text{-}R_m)$ for each trace, organizing the traces in increasing shift order; and selecting the trace that is linked to the smallest shift.

3. Method of decimation as set forth in claim 1, characterized in that the size of the decimation grid cell is chosen according to the decimation rate, wherein the larger the cell, the higher the decimation rate desired to be obtained.

4. Method of decimation as set forth in claim 1, characterized in that the cells of the decimation grid vary in size.

5. Method of decimation as set forth in claim 1, characterized in that the traces are treated in the order in which they arrive.

* * * * *